C. SPIRO.
CURTAIN CAMERA SHUTTER.
APPLICATION FILED DEC. 28, 1920. RENEWED APR. 1, 1922.
1,421,736.
Patented July 4, 1922.
2 SHEETS—SHEET 1.
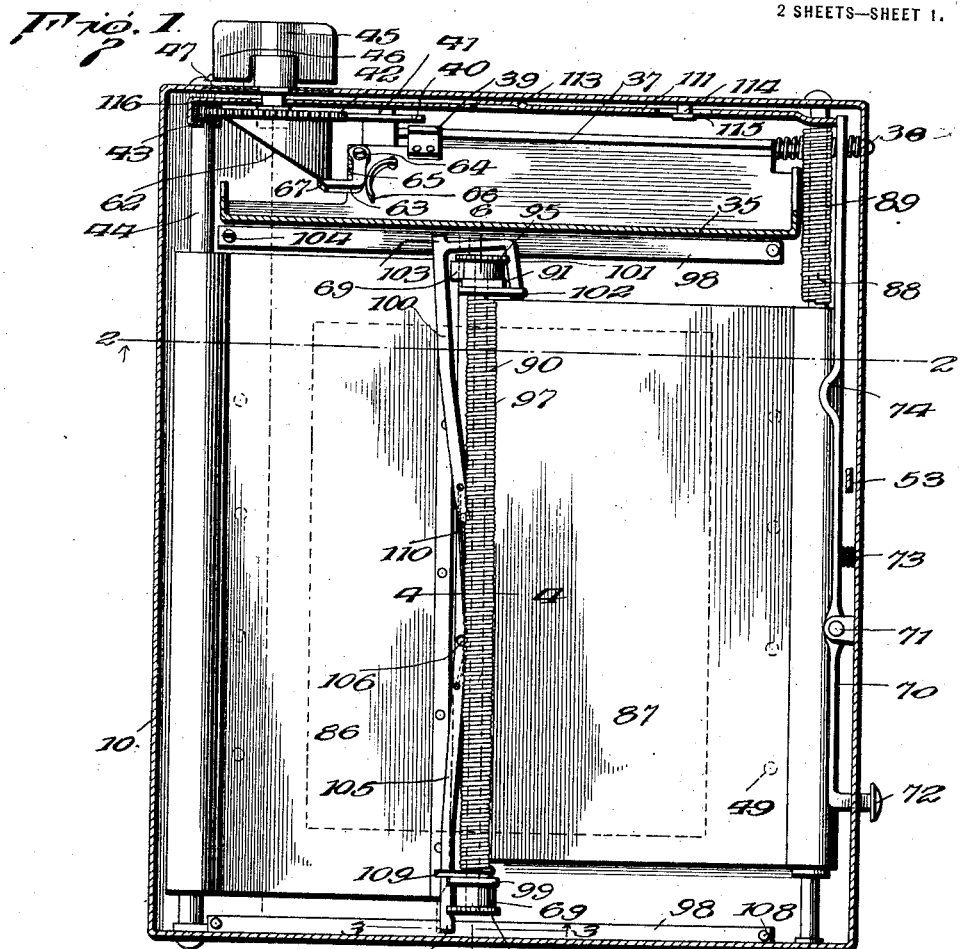
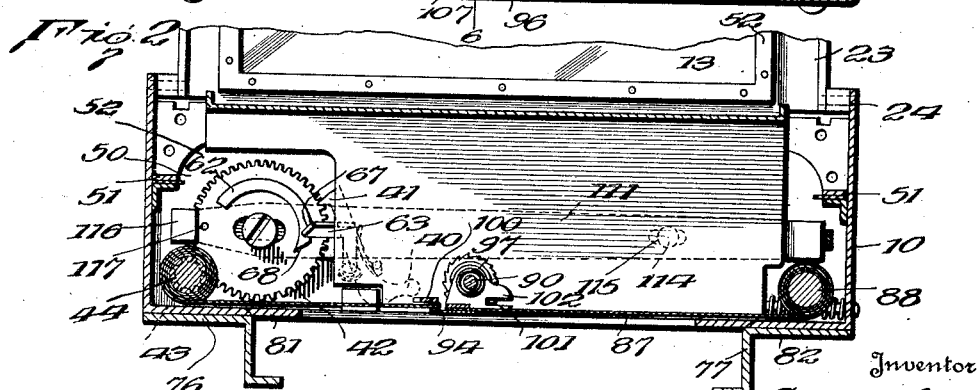
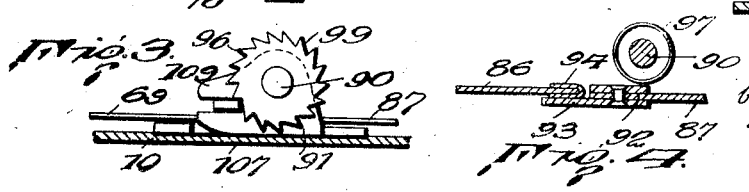
Inventor
Charles Spiro
by Alfred T. Gage
Attorney

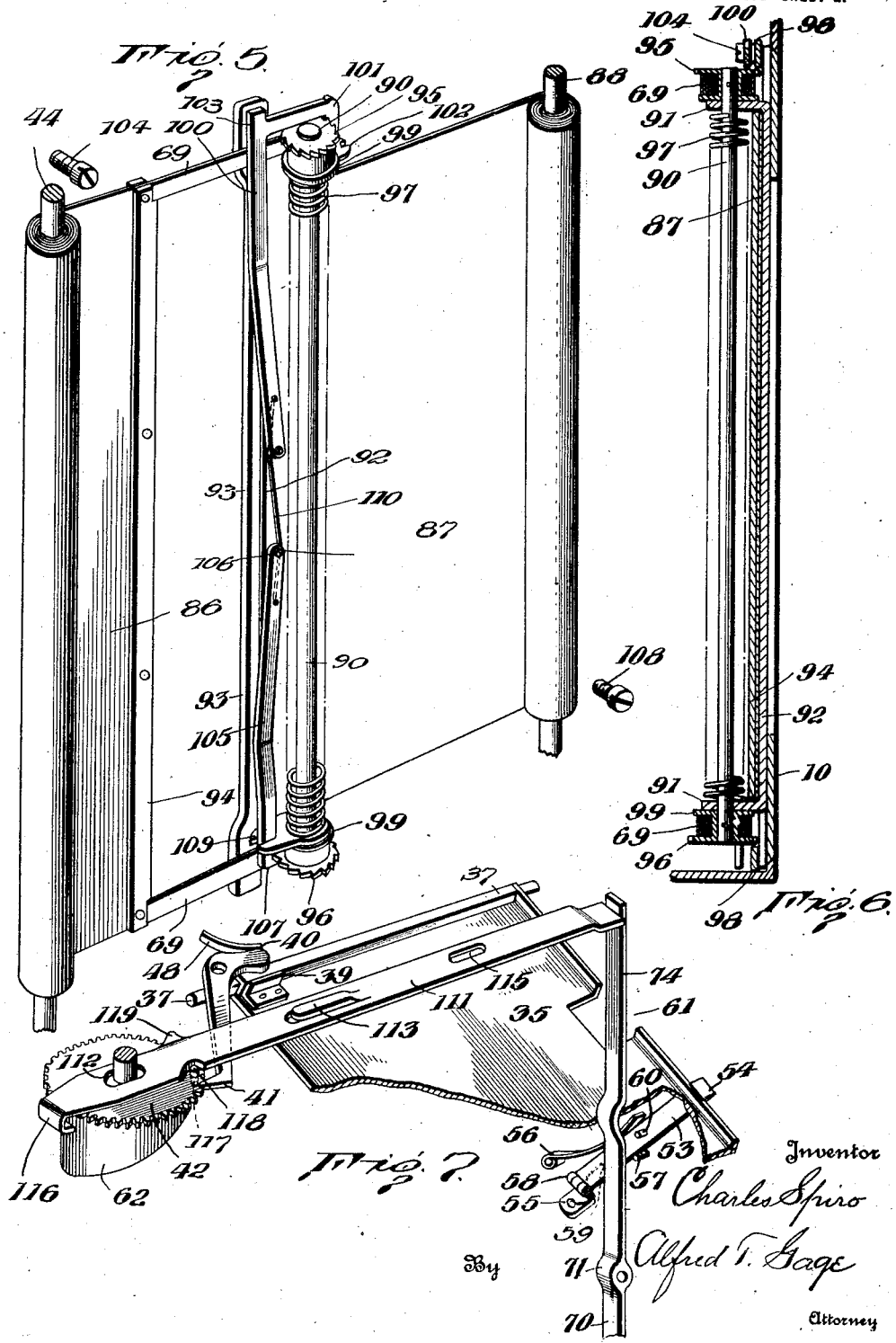

though not essential in the present disclosure the numeral 10 designates a case in which a reflector 35 is pivoted at its upper portion by a cross rod 37 tensioned by a spring 38 to raise the reflector out of the lens field before exposure. The pivoted end of the reflector carries a trip lug

UNITED STATES PATENT OFFICE.

CHARLES SPIRO, OF NEW YORK, N. Y.

CURTAIN CAMERA SHUTTER.

1,421,736. Specification of Letters Patent. Patented July 4, 1922.

Application filed December 28, 1920, Serial No. 433,598. Renewed April 1, 1922. Serial No. 548,794.

*To all whom it may concern:*

Be it known that I, CHARLES SPIRO, citizen of the United States, residing at New York, in the county of New York and State of New York, have invented certain new and useful Improvements in Curtain Camera Shutters, of which the following is a specification.

This invention relates to a curtain camera shutter and particularly to a construction wherein the curtains are separated to different extents to establish the desired exposure opening and subsequently moved while separated across the field of the lens.

The invention has for an object to provide a novel and improved construction of curtain shutters normally retained in either their contacting or separated positions and adapted to be automatically released for separation at one extreme of their joint movement and to be automatically closed at the opposite extreme of such movement.

A further object of the invention is to present a new structure of curtain shutter comprising separable members one of which is provided with means for positively retaining the members in closed or separated positions, together with means actuated by the separation of the curtains for tensioning the retaining means to effect a subsequent closing of the curtains.

Another object of the invention is to provide an improved construction of shutter curtains, one being provided with a closing spring adapted to be tensioned by bands extending to the opposite curtain, and controlling pawls for said spring mounted to be released independently in the travel of the curtains in opposite directions.

A further object of the invention is to present a novel construction of timing mechanism cooperating with the winding wheel for the shutter curtains to retain the same in separated relation in the lens field for the desired period for a time exposure.

Other and further objects and advantages of the invention will be hereinafter set forth and the novel features thereof set forth by the appended claims.

In the drawings—

Figure 1 is a vertical section showing the shutter applied to a reflex camera;

Figure 2 is a cross section on line 2—2 of Figure 1;

Figure 3 is a detail section on line 3—3 of Figure 1;

Figure 4 is a similar section on line 4—4 of Figure 1;

Figure 5 is a perspective of the shutter curtains;

Figure 6 is a detail section on the line 6—6 of Figure 1, and

Figure 7 is a perspective of the timing mechanism and its associated parts.

Like numerals refer to like parts in the several figures of the drawings.

The shutter mechanism is herein shown as applied to a reflex camera, such as is disclosed in my application filed Dec. 28, 1920, Serial No. 433,597, but is applicable to any desired type or construction of camera. In the present disclosure the numeral 10 designates a case in which a reflector 35 is pivoted at its upper portion by a cross rod 37 tensioned by a spring 38 to raise the reflector out of the lens field before exposure. The pivoted end of the reflector carries a trip lug 39 cooperating with a finger 40 upon an angular retaining pawl 41 engaging the teeth of a winding wheel 42 which meshes with a cog 43 upon the shaft 44 of one of the curtain shutters. The pawl is held in normal engagement with the wheel by a spring 48 operating against its finger 40, and the wheel is rotated by a finger piece 45 upon its shaft at the outside of the case. This finger piece is formed with wings 46 to cooperate with suitable indications 47 upon the outer face of the case.

The reflector is held in operative position in the field of the lens and against the tension of its spring by a latch 53 having an inturned bevelled end 54 to engage the side edge thereof. This latch is pivoted at 55 for movement in a vertical plane and tensioned downward by a spring 56 into contact with a stop 57 upon the case. The free end of the latch is pivoted at 58 for lateral movement and tensioned toward the reflector by a spring 59. The latch is provided with a pin 60 to be engaged by the back of the reflector and swung upon its longitudinal pivot until its free end reaches a cut-out portion 61 of the reflector when it folds inward upon the front face thereof, see Figure 7.

The reflector is positioned in the lens field by a curved cam 62 which cooperates with a dog 63 pivoted at 64 upon the reflector and held against a stop 65 by a spring 66. To effect a retraction of the dog during the exposure movement its face is bevelled at 67 and contacts with an inclined face 68 upon the cam.

The reflector is released by a lever 70 pivoted at 71 on the case and having an operating end 72 extended therethrough. Its opposite end 74 is tensioned by spring 73 and acts to withdraw the latch from the reflector. This end 74 also controls the timing mechanism to be described and is spaced from the latch to act first upon said mechanism which is held inoperative by the spring tension. The reflector and its controlling members have been herein described as one means for releasing the curtain shutters for exposure at the proper time, but the novel features thereof are made the subject of a separate application filed of even date herewith.

The winding shaft 44 actuated by the wheel 42, before described carries one section of the curtain shutter, herein designated as the adjustable section 86 which cooperates with a fixed section 87 carried by the tension shaft 88 at the opposite side of the case. This tension shaft is provided with a restoring spring 89, extending therefrom to the casing, which is placed under tension in the winding action to set the curtains for exposure. The spring 89 shifts both curtains in unison but the curtains when separated are again brought into contact by an independent tension device to be now described.

The adjustable curtain is connected to the fixed curtain by bands 69 extending therefrom to drums 99 secured to a shaft 90 mounted in bearngs 91 from an edge bar 92 secured to the fixed curtain. This edge bar carries a flange 93 which extends beneath an edge bar 94 on the adjustable curtain to provide an interlocked light proof joint. The drum shaft is provided at opposite ends with ratchet wheels 95 and 96, having oppositely disposed teeth, and is surrounded by a coiled closing spring 97 secured thereto and to the edge plate at its opposite ends. This spring is placed under tension as the curtains are separated and acts to draw the same into contact after exposure. The ends of the edge bar 92 travel in guides 98 upon the casing to insure movement in a straight path.

To effect the separation and closing of the curtain shutters the spring actuated drums thereon are controlled by trip pawls. Cooperating with the ratchet wheel 95 is a pivoted yoke pawl 100 embracing the drum and having its free end 101 guided by a slotted plate 102 from the drum bearing. This pawl is released during the winding action by its contact face 103 engaging a stop 104 upon the case adjacent the winding shaft which permits the curtains to be separated to the desired extent for exposure. The drum being released the continued winding movement separates the adjustable curtain from the fixed curtain and tensions the drum shaft.

The ratchet wheel 96 cooperates with a closing pawl 105 which is pivoted at 106 upon the edge bar and its free end 107 contacts with a release pin 108 upon the case during the final portion of the exposure movement. This free end is guided by a slotted plate 109 from the bearing, and both pawls are tensioned toward their ratchet wheels by a spring 110 connected to the pawls at their pivoted ends. When the exposure movement begins the release pawl reengages its ratchet and the curtains are held in their separated position until after passing the lens field. The closing pawl is then released and the curtains drawn into contact by the spring upon the drum shaft. The wings upon the finger piece by their cooperation with the indications upon the case (Figure 1) accurately determine the extent to which the curtains are to be separated during exposure.

For the purpose of timing the exposure the curtains are separated to the widest extent until the opening is in the lens field where they are held for the period desired for the time exposure. This may be accomplished by a slide 111 disposed between the winding wheel and case and having an elongated slot 112 embracing the shaft of said wheel. This slide is normally held in inoperative position by the extended end 74 of the release lever 70 which is tensioned toward the slide by its spring. The slide may be provided with a friction retaining means, such as a lip 113 cut therefrom and bent to engage the case, while the extended end of the slide is guided by a pin 114 travelling in a slot 115 therein. The opposite end of the slide is bent over and beneath the wheel to form an abutment 116 in the path of a post 117 carried by the under face of the winding wheel to thereby lock its releasing action. This post is also extended above the wheel at 118 and disposed to engage a lug 119 on the slide to shift it longitudinally into locking position.

In the operation the post travels substantially eight-tenths of a complete revolution during the winding action and passes the abutment upon the slide and also the entire area of curtain adjustment, after which it engages and shifts the slide into locking position. The timing mechanism thus does not become effective during any use for snap exposure with varied curtain separation, and only after the curtains have been separated to the greatest extent. In the reversed exposure movement the post travels from the slide lug into contact with the abutment and during this period the curtains shift to full open position in the lens field in which they remain so long as the finger pressure is retained upon the release lever. When this is relieved the lever shifts the slide out of the path of the post and the curtains complete their travel in unison after which they are closed as before described. This construction provides for the action of the timing mechanism entirely independent of all adjustments for the snap action so that there is no conflict between the different shutter actions.

In the winding action to tension the curtain shutters they are jointly moved in closed position until the release pawl reaches its trip pin which releases the ratchet wheel controlled thereby and permits the curtains to separate. During this action the bands from the adjustable curtain tension the spring upon the drum shaft on the fixed curtain for the subsequent closing action. The extent of the winding action determines the degree of exposure opening between the curtains and the reverse movement thereof for exposure occurs as soon as the reflector releases the retaining pawl for the winding wheel. This movement first withdraws the release pawl from its trip pin and it reengages its ratchet wheel to hold the curtains in their separated position. The continued movement carries the separated curtains past the lens field and toward the end thereof the closing pawl is tripped by its pin which permits the spring upon the drum shaft to tightly close the curtains.

The invention presents a simple, efficient and economically manufactured construction of curtain shutter, adapted for either snap or time exposure, and provided with tension means for jointly shifting the shutters and independent tension means for controlling the relative movemet of the curtains to each other. While the details of the invention have been specifically shown and described, still it is not confined thereto, as changes and alterations may be made therein without departing from the spirit of the invention.

What I claim is—

1. In a curtain shutter, separable curtains, means for moving said curtains in unison, means thereon for locking said curtains in contact, relatively fixed means for releasing said curtains for separation in their travel in one direction, and means upon one curtain for drawing said curtains into contact in their opposite travel.

2. In a curtain shutter, separable curtains, means thereon for retaining said curtains in contact, winding means for moving said curtains in unison in one direction, relatively fixed means for releasing said curtains for separation during their winding movement, tension means for moving said curtains in unison during their exposure movement, and means upon one curtain for drawing said curtains into contact after said exposure movement.

3. In a curtain shutter, separable curtains, means thereon for retaining said curtains in contact, winding means for moving said curtains in unison in one direction, relatively fixed means for releasing said curtains for separation during their winding movement, tension means for moving the curtains in unison during their exposure movement, timing means controlling said tension means for temporarily holding said curtains in the lens field, and means upon one curtain for drawing said curtains into contact after said exposure movement.

4. A curtain shutter comprising separable members, tension means for shifting said members in unison, and independent tension means thereon for moving said members toward each other when separated.

5. A curtain shutter comprising separable members, tension means for shifting said members in unison, independent tension means thereon for moving said members toward each other when separated, and relatively fixed means for automatically controlling the separation and closing of said members.

6. A curtain shutter comprising separable members, means thereon for retaining said members in contact during the preliminary winding action, and cooperating relatively fixed means to release and to permit the separation of said members during the subsequent winding action.

7. A curtain shutter comprising separable members, means thereon for retaining said members in contact during the preliminary winding action, relatively fixed means to control the separation of said members during the subsequent winding action, and means upon one member tensioned during the separation to close said members after the exposure movement.

8. A curtain shutter comprising separable members, a spring controlled shaft upon one member, means extending therefrom to the other member, releasing means operating upon said shaft to permit tensioning of the spring and separation of the curtains, and closing means operating upon the shaft to release its spring to draw the curtains into contact.

9. A curtain shutter comprising separable members, a spring controlled shaft upon one member, connecting means extending therefrom to the other member, fixed stops disposed adjacent the limits of travel in opposite directions, releasing means engaging one of said stops and operating upon said shaft to permit separation of the members and tensioning of the spring, and closing means engaging the opposite stop and operating upon the shaft to release its spring to draw the members into contact.

10. A curtain shutter comprising separable members, a spring controlled shaft upon one member, bands extending therefrom to the other member, oppositely disposed ratchet wheels secured to said shaft, a releasing pawl engaging one of said ratchet wheels, a closing pawl engaging the opposite ratchet wheel, and means to automatically release said pawls in the opposite movements of said members.

11. A curtain shutter comprising separable members, a spring controlled shaft upon one member, bands extending therefrom to the other member, oppositely disposed ratchet wheels secured to said shaft, a releasing pawl engaging one of said wheels, a closing pawl engaging the opposite wheel, means for tensioning said pawls into contact with said wheels, and fixed stops disposed to engage and trip said pawls in the opposite movements of said members.

12. A curtain shutter comprising separable members, a bar secured to one of said members and provided with bearings at opposite ends, a shaft mounted in said bearings and having winding drums thereon, connections extending from said drums to the opposite member, a closing spring connected to said shaft and bar, oppositely disposed ratchet wheels secured to said shaft, pawls pivoted upon the bar and tensioned to engage said wheels, and independent means for releasing said pawls in the opposite direction of travel of said members.

13. A curtain shutter comprising separable members, a bar secured to one of the members and provided with bearings at opposite ends, a drum shaft mounted in said bearings, bands extending from said shaft to the opposite member, a closing spring surrounding said shaft, oppositely disposed ratchet wheels secured to said shaft, a yoke pawl pivoted upon the bar and tensioned to engage one of said wheels, a straight pawl pivoted upon the bar and tensioned to engage the opposite wheel, slotted guide lugs from said bar to receive said pawls, and fixed stops disposed to engage the free ends of said pawls in the opposite movements of said members.

14. A curtain shutter comprising separable members, an edge bar secured to one member and provided with bearings at opposite ends, guides to receive the free ends of said bar, a flange carried by said bar, an edge bar upon the opposite member disposed to overlap said flange, tension closing means mounted in said bearings and connected to said opposite member, and means for controlling said closing means.

15. A curtain shutter comprising separable members, a winding wheel having an operating finger piece, a winding shaft geared thereto and carrying one member, a tension shaft carrying the opposite member, means for retaining and releasing said wheel, tension means upon one member for drawing the other into contact therewith, releasing means to permit the separation of the members, and means to effect the closing of the members through the tension means thereon.

16. A curtain shutter comprising separable members, a winding wheel connected to one of said members, a tension shaft connected to the opposite member, tension means upon the members for retaining said members in separated or closed positions, relative fixed controlling devices for said tension means, a timing slide having shifting means and an abutment to engage said wheel, and means for normally retaining said slide out of contact therewith.

17. A curtain shutter comprising separable members, a winding wheel connected to one of said members, a tension shaft connected to the opposite member, a timing slide provided with shifting means and an abutment, a stop member upon the wheel to engage said abutment, and a shift member upon the wheel disposed to move said slide into locking position.

18. A curtain shutter comprising separable members, a winding wheel connected to one of said members, a tension shaft connected to the opposite member, a timing slide provided with an abutment and a shift face, a stop post upon one face of the wheel to engage said abutment, and a shift post upon the opposite face and move the slide into locking position of the wheel to engage said shift face.

19. A curtain shutter comprising separable members, a winding wheel connected to one of said members, a tension shaft connected to the opposite member, a timing slide slotted to embrace the shaft of said wheel, an abutment at one end of said slide embracing the edge of the wheel, a shift lug intermediate the ends of the slide, means to frictionally retain the slide in shifted position, a stop post upon the wheel to engage said abutment, and a shift post upon the wheel to engage said shift lug and move the slide into locking position.

20. A curtain shutter comprising separable members, a winding wheel connected to one of said members, a tension shaft connected to the opposite member, a timing member having means to lock said wheel, means carried by the wheel to shift the timing member into locking position, a release member tensioned to normally hold the timing member in inoperative position, and releasing means for the winding wheel disposed for actuation by said release member.

21. A curtain shutter comprising separable members, a winding wheel connected to one of the members, a tension shaft connected to the opposite member, means to permit the separation and effect the closing of said members, a timing member having means to lock said wheel, means carried by the wheel to shift the timing member into locking position subsequent to the separation of the curtains, and means normally retaining said timing member in inoperative position but permitting its locking shift by the winding wheel when out of contact therewith.

22. A curtain shutter comprising separable members, a winding wheel connected to one of the members, a tension shaft connected to the opposite member, means to permit the separation and effect the closing of said members, means carried by the wheel to shift the timing member into locking position subsequent to the separation of the members, locking means upon the wheel to engage said timing member when the separated curtains are in the lens field, and manually controlled means for shifting the timing member into inoperative position after a desired period of time.

In testimony whereof I affix my signature.

CHARLES SPIRO.